United States Patent
Fujita

(10) Patent No.: US 9,774,978 B2
(45) Date of Patent: Sep. 26, 2017

(54) POSITION DETERMINATION APPARATUS, AUDIO APPARATUS, POSITION DETERMINATION METHOD, AND PROGRAM

(71) Applicant: Yamaha Corporation, Hamamatsu-shi, Shizuoka (JP)

(72) Inventor: Hiroyuki Fujita, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/315,265

(22) PCT Filed: Jun. 2, 2015

(86) PCT No.: PCT/JP2015/065853
§ 371 (c)(1),
(2) Date: Nov. 30, 2016

(87) PCT Pub. No.: WO2015/186686
PCT Pub. Date: Dec. 10, 2015

(65) Prior Publication Data
US 2017/0201847 A1    Jul. 13, 2017

(30) Foreign Application Priority Data

Jun. 2, 2014  (JP) .................................. 2014-114350

(51) Int. Cl.
*H04R 5/02* (2006.01)
*H04S 7/00* (2006.01)
(Continued)

(52) U.S. Cl.
CPC ............. *H04S 7/303* (2013.01); *G01B 11/14* (2013.01); *G06F 3/165* (2013.01); *H04S 5/005* (2013.01); *H04S 2400/01* (2013.01)

(58) Field of Classification Search
CPC ...... H04S 7/303; H04S 2400/01; H04S 5/005; G06F 3/165; G01B 11/14
(Continued)

(56) References Cited

U.S. PATENT DOCUMENTS

2012/0114137 A1*  5/2012  Tsurumi ................. H04S 7/303
                                                     381/92

FOREIGN PATENT DOCUMENTS

JP       2000-354300 A     12/2000
JP       2006-31475 A      2/2006
(Continued)

OTHER PUBLICATIONS

International Search Report (PCT/ISA/220 & PCT/ISA/210) issued in PCT Application No. PCT/JP2015/065853 dated Jul. 28, 2015 with English translation (10 pages).
(Continued)

*Primary Examiner* — Paul S Kim
(74) *Attorney, Agent, or Firm* — Crowell & Moring LLP

(57) ABSTRACT

A position determination apparatus includes: an image capturing unit that captures an image of a loudspeaker from a listening position while facing in an image capturing direction, to acquire image data; a direction detection unit that detects the image capturing direction; a recognition unit that recognizes an image of the loudspeaker from the image data; a distance calculation unit that calculates a distance from the listening position to the loudspeaker by using the image of the loudspeaker; and a location determination unit that determines a location of the loudspeaker based on the image capturing direction detected by the direction detection unit and the distance calculated by the distance calculation unit.

8 Claims, 14 Drawing Sheets

(51) Int. Cl.
  *G01B 11/14* (2006.01)
  *G06F 3/16* (2006.01)
  *H04S 5/00* (2006.01)

(58) Field of Classification Search
  USPC .......................................................... 381/303
  See application file for complete search history.

(56) References Cited

FOREIGN PATENT DOCUMENTS

| | | |
|---|---|---|
| JP | 2007-271480 A | 10/2007 |
| JP | 2009-246528 A | 10/2009 |
| JP | 2010-127779 A | 6/2010 |
| JP | 2012-104871 A | 5/2012 |
| JP | 2013-58991 A | 3/2013 |

OTHER PUBLICATIONS

Japanese-language Written Opinion (PCT/ISA/237) issued in PCT Application No. PCT/JP2015/065853 dated Jul. 28, 2015 (five pages).

\* cited by examiner

| LOUDSPEAKER MODEL | IMAGE | TRANSFORMATION COEFFICIENT | EFFICIENCY |
|---|---|---|---|
| S001 | | A1 | B1 |
| S002 | | A2 | B2 |
| S003 | | A3 | B3 |

FIG. 13A

| USER A (11-22-33-01-00-05) ||
|---|---|
| Time | SUBJECT (MAC ADDRESS) |
| 2013/5/12 14:03:05 | 11-22-33-01-00-02 |
| 2013/5/12 14:00:02 | 11-22-33-01-00-03 |

| USER B (11-22-33-01-00-02) ||
|---|---|
| Time | SUBJECT (MAC ADDRESS) |
| 2013/5/12 14:03:05 | 11-22-33-01-00-05 |
| 2013/5/12 14:00:02 | 11-22-33-01-00-06 |

⋮

POSITION DETERMINATION APPARATUS, AUDIO APPARATUS, POSITION DETERMINATION METHOD, AND PROGRAM

TECHNICAL FIELD

The present invention relates to a position determination apparatus that determines the position of a loudspeaker with respect to a listening position.

Priority is claimed on Japanese Patent Application No. 2014-114350, filed Jun. 2, 2014, the content of which is incorporated herein by reference.

BACKGROUND ART

Conventionally, known is an audio apparatus that forms a surround sound field by inputting a multichannel audio signal such as a 5.1 channel, and then outputting the sound of the respective channels from a plurality of loudspeakers.

In order to appropriately realize such a surround sound field, it is necessary to arrange a plurality of loudspeakers at appropriate positions (recommended positions) within a listening room. Therefore, known is a technique that forms a desired sound field by calculating the positions of the loudspeakers by collecting the sound output from each loudspeaker using a plurality of microphones, and then correcting the audio signal supplied to the loudspeakers based on the calculation result (refer to Patent Document 1 for example).

PRIOR ART DOCUMENTS

Patent Document

[Patent Document 1] Japanese Unexamined Patent Application, First Publication No. 2000-354300

SUMMARY OF THE INVENTION

Problem to be Solved by the Invention

However, in order to determine the position of a loudspeaker, it is necessary to use a plurality of microphones, or to move a single microphone and perform a plurality of measurements.

Furthermore, there is also a problem in that it takes a long time to output and measure a sound.

An example of an object of the present invention is to provide a position determination apparatus that is able to determine the position of a loudspeaker without using a microphone.

Means for Solving the Problem

A position determination apparatus according to an aspect of the present invention includes: an image capturing unit that captures an image of a loudspeaker from a listening position while facing in an image capturing direction, to acquire image data; a direction detection unit that detects the image capturing direction; a recognition unit that recognizes an image of the loudspeaker from the image data; a distance calculation unit that calculates a distance from the listening position to the loudspeaker by using the image of the loudspeaker; and a location determination unit that determines a location of the loudspeaker based on the image capturing direction detected by the direction detection unit and the distance calculated by the distance calculation unit.

A position determination method according to an aspect of the present invention includes: capturing an image of a loudspeaker from a listening position while facing in an image capturing direction, to acquire image data; detecting the image capturing direction; recognizing an image of the loudspeaker from the image data; calculating a distance from the listening position to the loudspeaker by using the image of the loudspeaker; and determining a location of the loudspeaker based on the detected image capturing direction and the calculated distance.

A program according to an aspect of the present invention causes a computer to execute: capturing an image of a loudspeaker from a listening position while facing in an image capturing direction, to acquire image data; detecting the image capturing direction; recognizing an image of the loudspeaker from the image data; calculating a distance from the listening position to the loudspeaker by using the image of the loudspeaker; and determining a location of the loudspeaker based on the detected image capturing direction and the calculated distance.

Effect of the Invention

According to the present invention, it is possible to determine the position of a loudspeaker without using a microphone.

BRIEF DESCRIPTION OF THE DRAWINGS

FIG. 13A is a diagram showing gaze information stored in the server shown in FIG. 10E.

FIG. 13B is a diagram showing gaze information stored in the server shown in FIG. 10E.

EMBODIMENTS FOR CARRYING OUT THE INVENTION

First Embodiment

Figure 1:
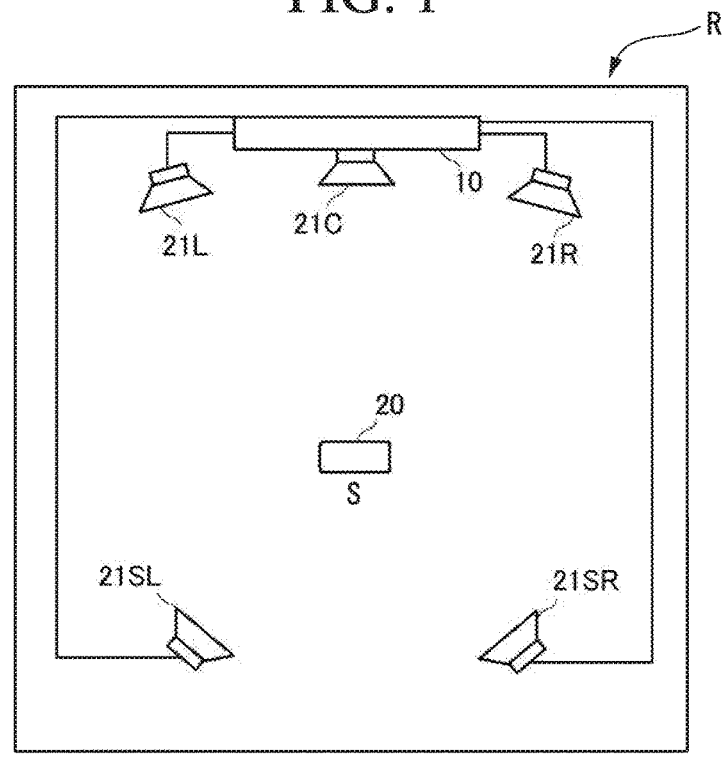
FIG. 1 is a block diagram showing a configuration of an audio system according to a first embodiment of the present invention.

FIG. 1 is a schematic diagram showing a configuration of an audio system including a position determination apparatus in a first embodiment of the present invention. The audio system includes an audio apparatus 10, a terminal 20, a loudspeaker 21C, a loudspeaker 21L, a loudspeaker 21R, a loudspeaker 21SL, and a loudspeaker 21SR (if each of the loudspeakers 21C to 21SR are not specifically distinguished, they are referred to as a loudspeaker 21).

The audio apparatus 10 is installed at a predetermined position of a room R (in front of a listening position S for example). The loudspeaker 21C is installed in front of the listening position S. The loudspeaker 21L is installed to the left front of the listening position S. The loudspeaker 21R is installed to the right front of the listening position S. The loudspeaker 21SL is installed to the left rear of the listening position S. The loudspeaker 21SR is installed to the right rear of the listening position S. The loudspeakers 21 are connected to the audio apparatus 10.

The terminal 20 is installed at the listening position S. The terminal 20 is an information processing apparatus such as a smartphone, and is a device carried by a user. The terminal 20 corresponds to a position determination apparatus in the first embodiment of the present invention. The locations of the loudspeakers 21 with respect to the listening position S are calculated by capturing images of the loudspeakers 21 while the user holds the terminal 20 at the listening position S. The information relating to the calculated locations of the loudspeakers 21 is transmitted to the audio apparatus 10. The information thereof is used for the correction of an audio signal.

Figure 2:
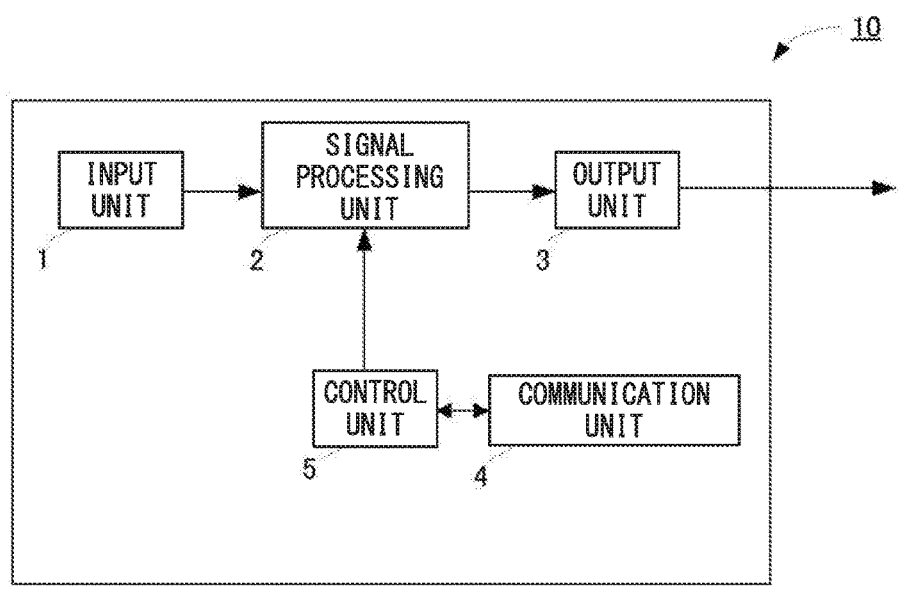
FIG. 2 is a block diagram showing a configuration of an audio apparatus shown in FIG. 1.

FIG. 2 is a block diagram showing a configuration of the audio apparatus 10. The audio apparatus 10 includes an input unit 1, a signal processing unit 2, an output unit 3, a communication unit 4, and a control unit 5.

The input unit 1 has an interface that accepts a digital audio signal input corresponding to a standard such as HDMI (registered trademark) (high definition multimedia interface) and S/PDIF (Sony Philips Digital Interface (SONY and PHILIPS are registered trademarks). The input unit 1 accepts a digital audio signal input from the exterior.

Furthermore, the input unit 1 may have an analog audio signal input interface, and accept an analog audio signal input from the exterior. In this case, the input unit 1 may have a built-in ADC (analog-to-digital converter) functionality that converts an inputted analog audio signal into a digital audio signal. The number of digital audio signal channels that are input may be one (monaural) or two (stereo). The input unit 1 may accept an input having a plurality of channels (5.1 channels for example).

The audio signal inputted to the input unit 1 is then inputted to the signal processing unit 2. The signal processing unit 2 includes a DAC (digital-to-analog converter), and performs correction of an inputted audio signal. It may adjust the volume of an audio signal supplied to the loudspeakers 21 such that the sound outputted from all of the loudspeakers 21 reaches the listening position S with the same volume for example. Alternatively, it may adjust the delay amount of an audio signal supplied to the loudspeakers 21 such that the sound outputted from all of the loudspeakers 21 reaches the listening position S with the same timing for example. Alternatively, if there is a displacement in the direction of a loudspeaker 21 from an ideal position when viewed from the listening position S, it may position a sound image such that a loudspeaker 21 is virtually arranged in the ideal position, by supplying the same sound to two loudspeakers 21 near the ideal position with a predetermined distribution ratio.

The audio signal corrected by the signal processing unit 2 is outputted to the loudspeakers 21 via the output unit 3. In the example shown in FIG. 2, a signal system with just a single representative channel is shown. However, in reality, signal processing is performed with respect to each of the channels, and the audio signal for each channel is outputted from the output unit 3.

The communication unit 4 performs communication with the terminal 20 via a communication functionality such as a wireless LAN (local area network). In this example, the communication unit 4 receives from the terminal 20, information representing the locations of the loudspeakers 21 with respect to the listening position S. The control unit 5 receives the information representing the locations of the loudspeakers 21 via the communication unit 4, and sets a correction parameter of the signal processing unit 2 based on the information thereof. The correction parameter represents a gain, a delay amount, and the like, of the audio signal of each channel.

Figure 3A:
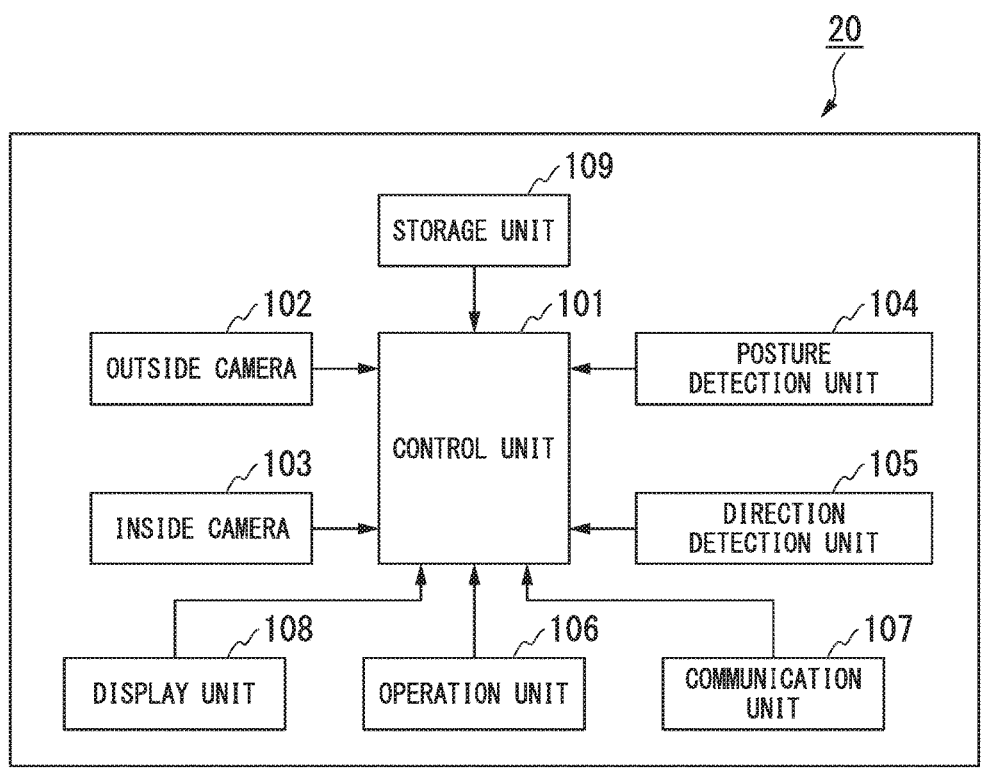
FIG. 3A is a block diagram showing a configuration of a terminal shown in FIG. 1.
Figure 3B:
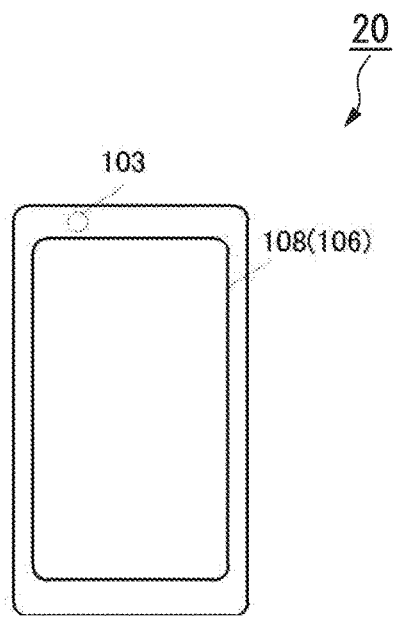
FIG. 3B is a front view of the terminal shown in FIG. 1.
Figure 3C:
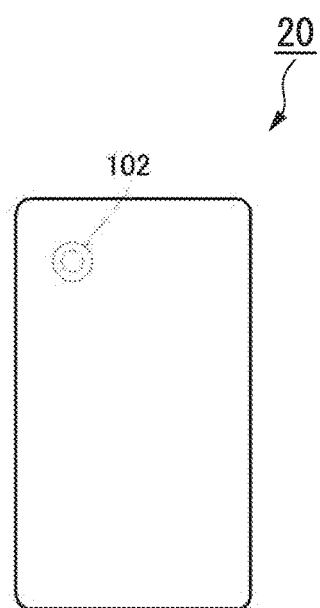
FIG. 3C is a rear view of the terminal shown in FIG. 1.

FIG. 3A is a block diagram showing a configuration of the terminal 20. FIG. 3B is a front view of the terminal 20. FIG. 3C is a rear view of the terminal 20.

The terminal 20 includes a control unit 101, an outside camera 102, an inside camera 103, a posture detection unit 104, a direction detection unit 105, an operation unit 106, a communication unit 107, a display unit 108, and a storage unit 109. The storage unit 109 may be a medium such as a ROM.

The control unit 101 reads out an operation program stored in a storage medium, and integrally controls an operation of the terminal 20. The control unit 101, as a result of the operation program thereof, constitutes a recognition unit, a model determination unit, a distance calculation unit, and a location determination unit in the first embodiment of the present invention. The storage unit 109 may be a recording medium such as a ROM, and it may also store the operation program.

The outside camera 102 corresponds to an image capturing unit in the first embodiment of the present invention. The outside camera 102 is provided on the rear surface of the terminal 20, and is a camera for capturing an image desired by a user. The inside camera 103 is provided on the front surface of the terminal 20, and is a camera for capturing an image of the user itself.

The control unit 101 detects a face image from the image captured by the inside camera 103, and detects a user's line of sight by extracting an image of an eye from within the detected face image. As the technique of detecting a line of sight, the techniques disclosed in Japanese Unexamined Patent Application, First Publication No. 2010-161655 or Japanese Unexamined Patent Application, First Publication No. 2008-32828 may be used for example. In the case of a state where the image of the pupil is in the center of the eye, it is determined that the line of sight is in the central direction for example. In the case of a state where the pupil is on the left side of the eye, it is determined that the line of sight is in the left direction.

Figure 9A:
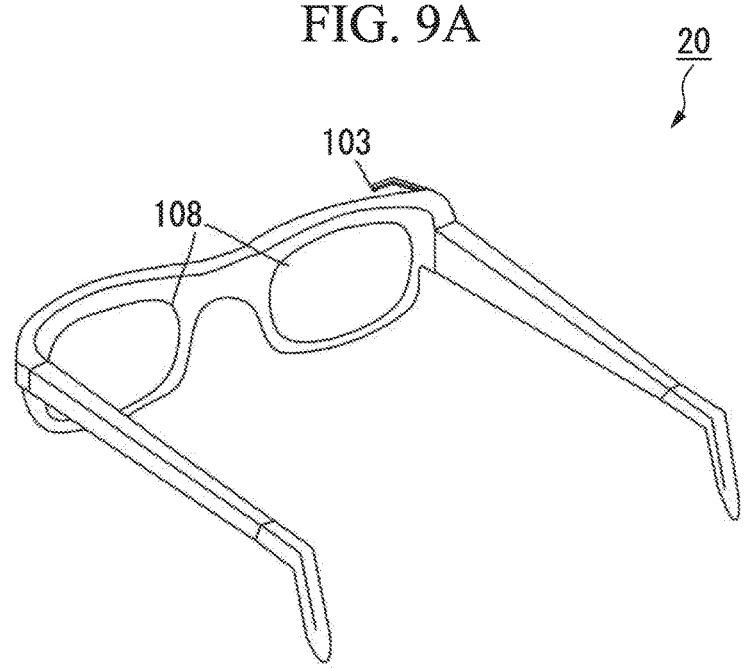
FIG. 9A is a schematic diagram showing an external view of an eyeglass-type terminal in the first embodiment of the present invention.
Figure 9B:
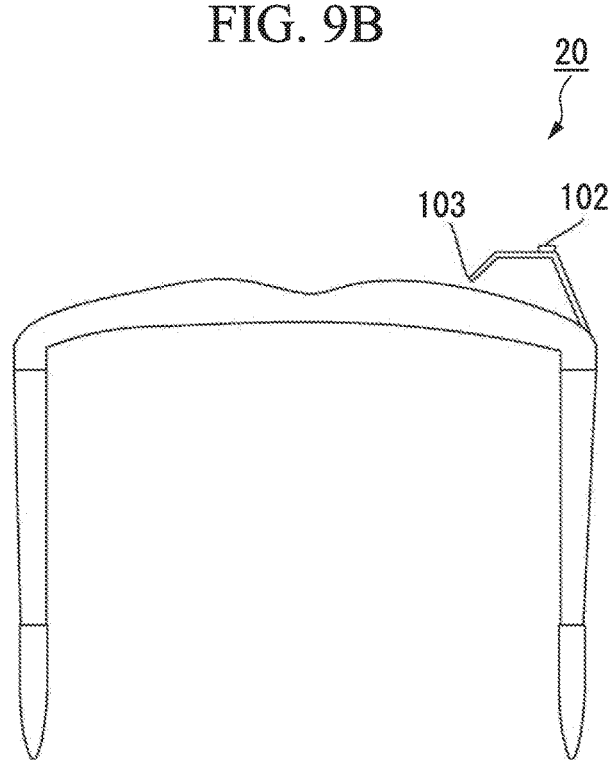
FIG. 9B is a schematic diagram showing an external view of the eyeglass-type terminal in the first embodiment of the present invention.

In the example of FIG. 3B and FIG. 3C, a portable-type information processing apparatus is presented as the terminal 20. However, the terminal 20 is in no way limited to such a mode. The terminal 20 may be a wearable-type information processing apparatus having an eyeglass shape as shown in FIG. 9A and FIG. 9B for example. A case where the terminal 20 is an eyeglass-shaped terminal, as in the example shown in FIG. 9A and FIG. 9B, is described. In this case, the outside camera 102 captures an image of the direction that the user's face is facing. The inside camera 103 captures an image of the user's eye. The image of the user's eye is used in gaze detection. A technique that performs line-of-sight detection in an eyeglass-shaped terminal is disclosed in Japanese Unexamined Patent Application, First Publication No. 2012-8290 for example. In the case of the example shown in FIG. 9A and FIG. 9B, a display unit 108 functions as a head-mounted display that projects an image on a lens section of the eyeglasses. However, in the case of an eyeglass-shaped terminal, configuration with a display unit 108 is not essential since it is possible to capture an image of the direction that the user's face is facing.

Returning to FIG. 3A, a configuration of the terminal 20 is described. The posture detection unit 104 includes a gyro sensor or an acceleration sensor for example. The posture detection unit 104 detects the posture of its own apparatus (the direction that the surface of the casing of the terminal 20 is facing). The direction detection unit 105 includes a geomagnetic sensor for example. The direction detection unit 105 detects the direction that its own apparatus is facing (the direction that the upper surface of the casing of the terminal 20 is facing for example). The control unit 101, based on the posture of its own apparatus detected using the posture detection unit 104 and the direction detected using the direction detection unit 105, detects the direction that the outside camera 102 is facing, that is to say the image capturing direction. A direction detection unit in the first embodiment of the present invention is realized by the control unit 101, the posture detection unit 104, and the direction detection unit 105.

The display unit 108 is provided on the front surface of the terminal 20, and displays various images. Here, the display unit 108 displays images captured by the outside camera 102. The user is able to confirm an image captured by the outside camera 102, by confirming the image displayed on the display unit 108. The display unit 108 has a touch panel, and also provides the functionality of the operation unit 106, which represents a user interface.

The user operates the terminal 20 at the listening position S, and captures an image of the loudspeakers 21 with the outside camera 102. That is to say, the outside camera 102 acquires image data by capturing an image of a loudspeaker 21 from the listening position S while facing in the image capturing direction. In this example, the locations of the loudspeakers 21 with respect to the listening position S are calculated as a result of the user capturing images of the loudspeakers 21 from the listening position S.

Figure 4A:
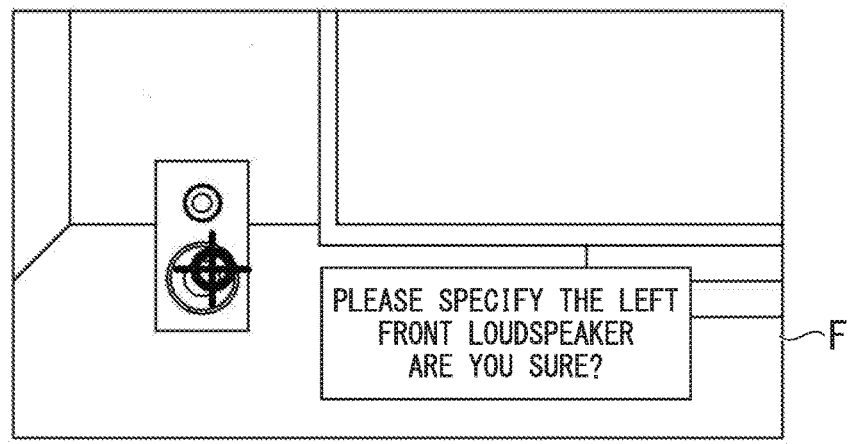
FIG. 4A is a diagram showing an example of a captured image in the first embodiment of the present invention.

FIG. 4A shows an example of an image captured by the outside camera 102. In this example, the user has captured an image of the loudspeaker 21L installed to the left front of the listening position S. In FIG. 4A, the image contains just a single loudspeaker 21L. However, it is in no way limited to such an example, and an image may contain a plurality of loudspeakers 21, such as the loudspeaker 21L and the loudspeaker 21R. In this case, the respective locations of a plurality of loudspeakers contained in a single image may be determined.

Figures 5, 6:
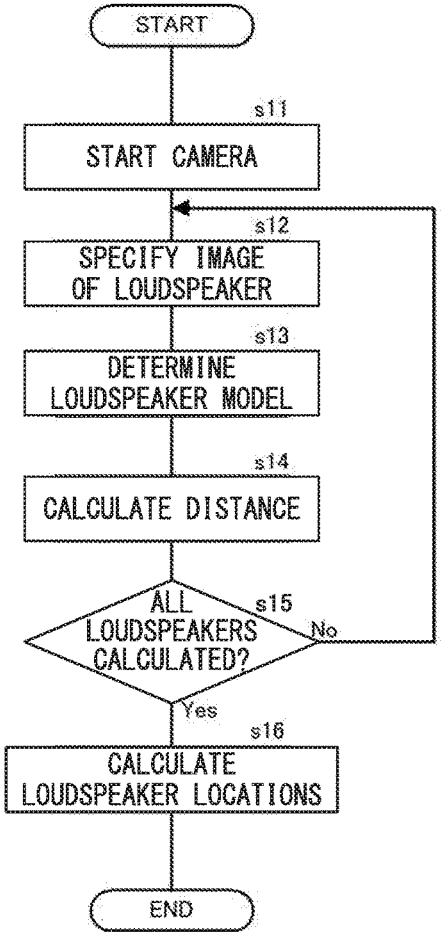
FIG. 5 is a flowchart showing an operation of the terminal shown in FIG. 1.
FIG. 6 is a diagram showing a model database stored in the terminal shown in FIG. 1.

FIG. 5 is a flowchart showing an operation of the control unit 101. When the user operates the operation unit 106 and starts up an application program for calculating the locations of the loudspeakers, the control unit 101 starts up the outside camera 102 (step s11). Then, as shown in FIG. 4A, the display unit 108 displays the image captured by the outside camera 102.

The user specifies an image of a loudspeaker 21 from the image displayed on the display unit 108 (step s12).

A case where the display unit 108 has a touch panel is described. In this case, the user is able to specify the image of the loudspeaker 21 by a touch operation with respect to the image of the loudspeaker 21.

A case where the control unit 101 uses the inside camera 103 to detect the user's line of sight is described. In this case, if the control unit 101 determines that the user's line of sight is facing the image of the loudspeaker 21 for more than a predetermined time, that is to say, the user is gazing at the image of the loudspeaker 21, it determines that the image of the loudspeaker 21 is being specified.

A case where the control unit 101 performs an operation that determines the model of the loudspeaker 21 from the image captured by the outside camera 102, by means of a technique such as pattern matching, is described. In this case, the control unit 101 may determine that the image of the loudspeaker 21 has been specified at the point an image of a loudspeaker 21 corresponding to a specific model is extracted.

The control unit 101 may make the display unit 108 display a notice, such as "please specify the left front loudspeaker", to prompt the user to specify an image of the loudspeaker 21. Further, if the image of the loudspeaker 21 is specified, the control unit 101 may make the display unit 108 display a notice, such as "are you sure?", to perform confirmation. In a case where a notice for performing confirmation is to be displayed, the control unit 101 determines that, if the image of the loudspeaker 21 is specified again, the image of the loudspeaker 21 thereof has been specified. In a case where line-of-sight detection is performed, the control unit 101 determines that the image of the loudspeaker 21 has been specified again if a specific movement of the eye (a wink for example) is performed.

When the image of the loudspeaker 21 is specified, the control unit 101 refers to a model database and determines the model of the loudspeaker 21 by means of a technique such as pattern matching (step s13). The storage unit 109 may store the model database. An external server connected to the terminal 20 may store the model database.

FIG. 6 shows a model database. The model database associates and stores an image of the loudspeaker 21, a transformation coefficient, and an efficiency for each loudspeaker model. A model database is prepared for each type of terminal (that is to say, for each type of camera that captures images). The image of the loudspeaker 21 represents image data that is referred to when pattern matching is performed. The control unit 101 determines the model of a loudspeaker 21 by comparing the images of the loudspeakers 21 in the model database and the captured image of the loudspeaker 21. If the model cannot be determined to be a single model, the control unit 101 may select a plurality of candidates to be displayed on the display unit 108, and then determine the model by means of the user selecting the model.

Figure 4B:
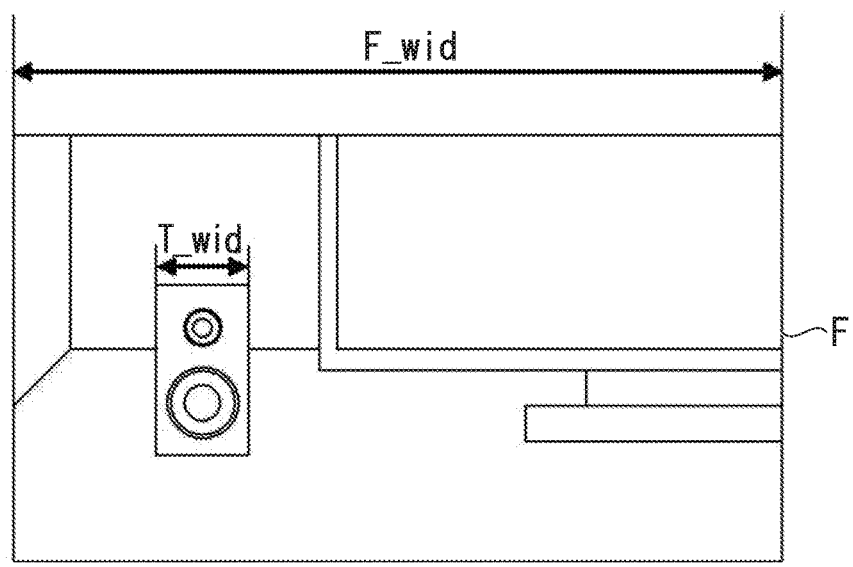
FIG. 4B is a drawing showing a relationship between the frame width of an image and the width of a loudspeaker image in the first embodiment of the present invention.

The transformation coefficient is a coefficient for calculating a distance D from the listening position S to a loudspeaker 21, from the size of the captured image of the loudspeaker 21. The transformation coefficient corresponds to scale data in the first embodiment of the present invention. The distance D and the image size of the loudspeaker 21 within the captured image have an inversely proportional relationship. The transformation coefficient recorded in the model database represents a relationship between a ratio R and the distance D. It represents, with respect to a width of a frame F of an image constituted by image data obtained by capturing an image of the loudspeaker 21 with the outside camera 102 of the terminal 20, the width ratio occupied by the image of the loudspeaker 21 in the image thereof. In the example shown in FIG. 4B, the ratio R represents the width of the loudspeaker 21 (T_wid) with respect to the width of the frame F (F_wid). The transformation coefficient is set beforehand. A setting example of a transformation coefficient A1 of a loudspeaker model S001 is described. Using a distance of 1 m as a reference (reference distance), it is assumed that, with respect to the width of a frame F constituted by reference image data acquired by capturing an image of the loudspeaker (reference loudspeaker) 21 from a position 1 m away from the listening position S, the ratio R of the width of the image of the loudspeaker 21 contained in the reference image data is 50% (approximately half of the horizontal width of the frame F). In this case, the transformation coefficient A1 of the loudspeaker model S001 is set to 0.5.

The control unit 101 reads out the transformation coefficient of the determined model of the loudspeaker 21, and calculates a distance D from the listening position S to the loudspeaker 21 based on the loudspeaker image (step s14). If the model of the loudspeaker 21 is determined as being the loudspeaker model S001 as described above, and the ratio R of the loudspeaker 21 in the image obtained by capturing an image in practice is 25%, then the distance D is calculated to be 2 m (=A1/R=0.5/0.25) for example.

The control unit 101 determines whether or not the processing that calculates the distance D in the above manner has been performed for all of the loudspeakers 21 installed around the listening position S (step s15). For example, when the application program starts up, the control unit 101 accepts from the user, a designation of the number of loudspeakers 21 (2 channel (stereo), 5 channel, 7 channel, and the like), and determines whether or not a distance D has been calculated for all of the designated loudspeakers 21.

Then, the control unit 101 calculates the direction in which the loudspeaker 21 is installed based on the direction of the outside camera 102 at the time it captured the loudspeaker image, and calculates the arrangement between its own apparatus (that is to say, the listening position S) and the loudspeaker 21 (step s16). The calculation result includes information relating to the directions and the distances D of each of the loudspeakers 21.

In the manner described above, the terminal 20 is able to determine the position of a loudspeaker 21 without using a microphone. The information relating to the directions and the distances D calculated for the loudspeakers 21 is transmitted to the audio apparatus 10 via the communication unit 107. The control unit 5 of the audio apparatus 10 receives the information thereof via the communication unit 4, and sets a correction parameter of the signal processing unit 2. The control unit 5 corresponds to a correction unit in the first embodiment of the present invention.

The control unit 5 may set a gain for the audio signal of each of the channels such that the sounds from all of the loudspeakers 21 reach the listening position S with the same volume for example. Furthermore, if an efficiency of each loudspeaker 21 (the efficiency recorded in the model database shown in FIG. 6) is included in the received information relating to the locations of the loudspeakers 21, then the control unit 5 may correct the volume differences that result from efficiency differences between the loudspeakers 21. If the efficiency of a loudspeaker 21S001 representing a reference is 90 dB, and the efficiency of a loudspeaker model S002 is 87 dB, then it is possible to correct the volume difference by raising the audio signal level supplied to the loudspeaker model S002 by 3 dB for example.

The control unit 5 may adjust a delay amount of the audio signal supplied to the loudspeakers 21 such that the sounds from all of the loudspeakers 21 reach the listening position S with the same timing for example. With respect to the distance between a reference loudspeaker 21 (the most distant loudspeaker) and the viewing position S, if the distance between another loudspeaker 21 and the viewing position S is 1 m shorter, then if the speed of sound is 340 m/s, a delay of 3 ms is applied to the audio signal provided to the another loudspeaker 21 thereof for example.

Figure 7A:
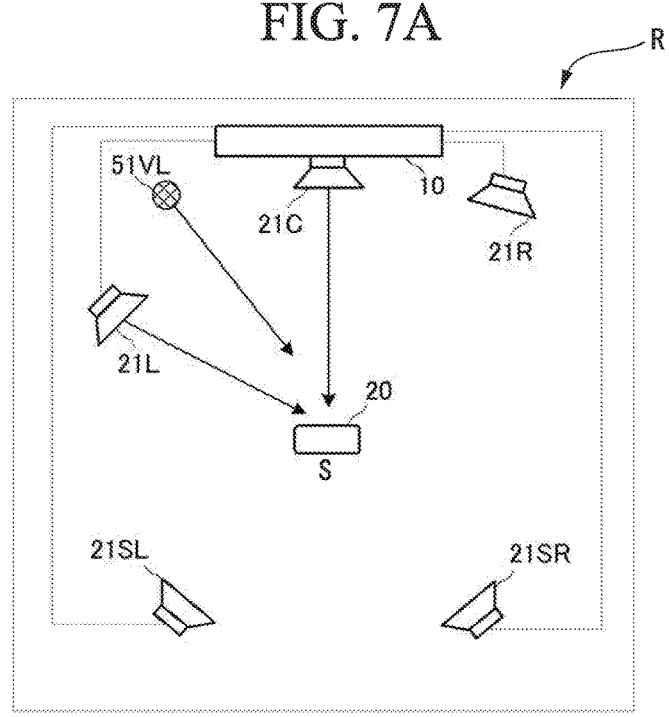
FIG. 7A is a diagram showing a virtual sound source in the first embodiment of the present invention.

If there is a displacement in the position of a given loudspeaker 21 from an ideal position when viewed from the listening position S, the control unit 5 positions the sound image such that a loudspeaker 21 is virtually arranged in the ideal position by supplying the same sound to two loudspeakers 21 near the ideal position of the given loudspeaker 21 thereof with a predetermined distribution ratio. As a specific example, as shown in FIG. 7A, a case where a loudspeaker 21L is displaced from an ideal position to the left side is described. In this case, by supplying the audio signal of the front L channel to the loudspeaker 21C and the loudspeaker 21L, a correction is performed such that the sound of the front L channel reaches the listening position S from a virtual sound source 51VL representing the ideal position of the front L channel loudspeaker.

Figure 7B:
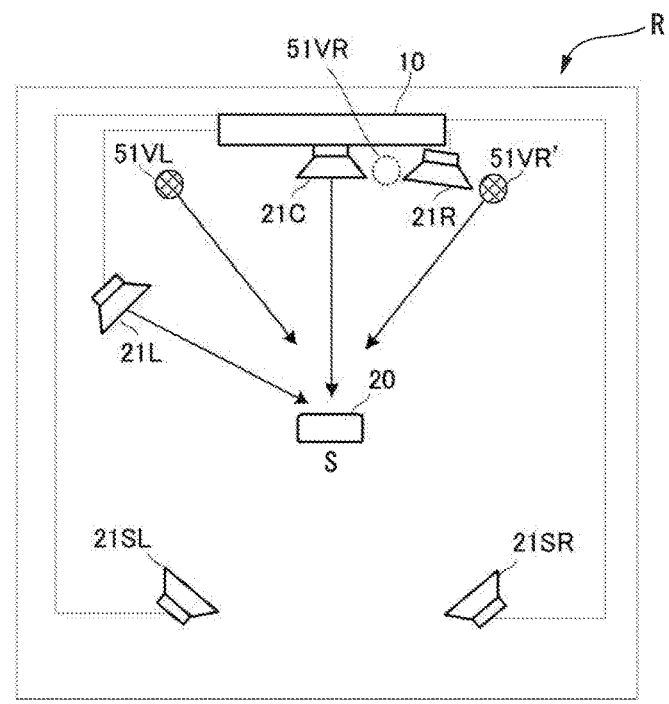
FIG. 7B is a diagram showing a virtual sound source in the first embodiment of the present invention.

As another specific example, as shown in FIG. 7B, a case where the spacing between a loudspeaker 21C and a loudspeaker 21R is narrow is described for example. In this case, if a virtual sound source is generated by distributing an audio signal between the loudspeaker 21C and the loudspeaker 21R, a virtual sound source 51VR becomes positioned in an inappropriate position. Therefore, in this case, it is possible to position a virtual sound source 51VR' in an appropriate position by distributing the audio signal of the front R channel between the loudspeaker 21R and a loudspeaker 21SR. That is to say, taking the ideal position of a given loudspeaker 21 as a reference, the audio signal to be supplied to the given loudspeaker 21 is distributed to the loudspeakers 21 that are closest to the given loudspeaker 21, among the loudspeakers that are positioned on the opposite side of the given loudspeaker 21.

In this manner, the audio apparatus 10 is able to position a sound image at an ideal virtual sound source position by obtaining information relating to the locations of the loudspeakers 21.

In the manner described above, in the audio system of the first embodiment, it is possible to calculate the locations of the loudspeakers 21 as a result of the user simply capturing images of the loudspeakers 21 using the terminal 20. Furthermore, it is possible to perform correction of an audio signal based on the locations of the loudspeakers 21 thereof.

In the first embodiment, although an example has been presented in which the control unit 101 of the terminal 20 calculates the arrangement of the loudspeakers 21, it is also possible for a portion of the processing to be executed by another apparatus such as a server.

Figure 8:
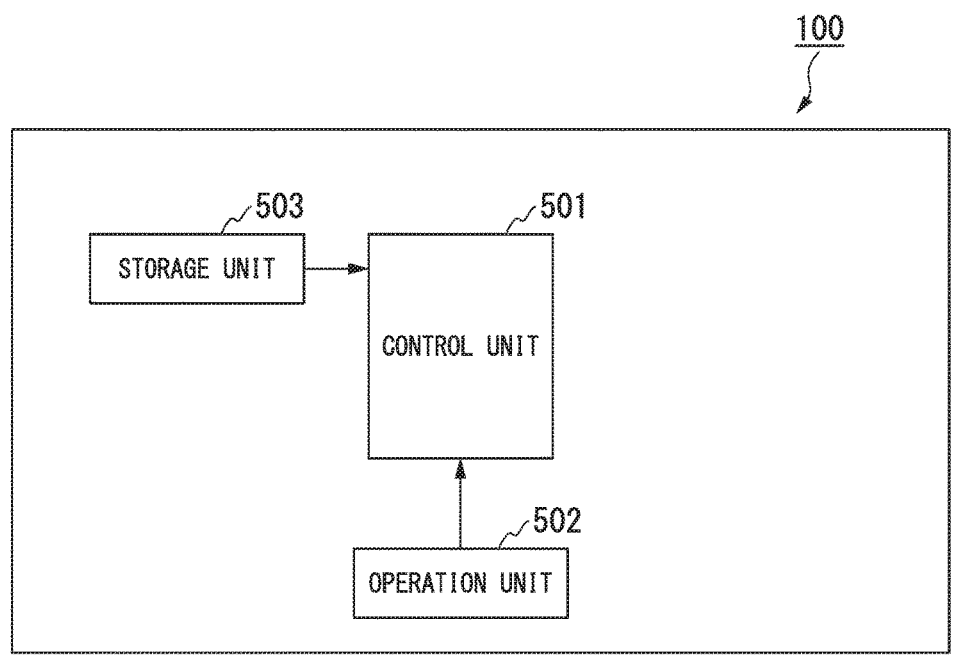
FIG. 8 is a block diagram showing a configuration of a server in the first embodiment of the present invention.

FIG. 8 is a block diagram showing a configuration of a server 100. The server 100 includes a control unit 501, a communication unit 502, and a storage unit 503. The storage unit 503 stores the model database mentioned above. The communication unit 502 communicates with the communication unit 107 of the terminal 20.

The control unit 501 receives via the communication unit 502, image data captured by the terminal 20 and information relating to the image capturing direction (image capturing direction of the camera) for when the image data was captured. The control unit 501 recognizes an image of a loudspeaker 21 from the image data received from the terminal 20, and determines a model of the loudspeaker 21.

Further, the control unit 501 reads out a transformation coefficient of the determined model from the model database, and calculates a distance D from the listening position S to the loudspeaker 21 thereof. Lastly, the control unit 501 calculates the location of the loudspeaker 21 based on the information relating to the image capturing direction and the calculated distance D of the loudspeaker 21. The communication unit 502 may transmit the calculation result to the terminal 20, or it may transmit it to the audio apparatus 10.

Second Embodiment

Figure 10A:
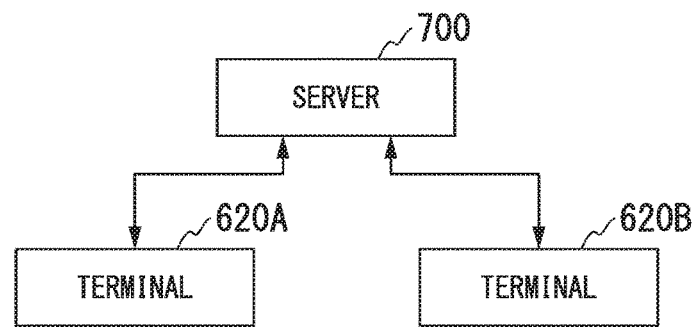
FIG. 10A is a diagram showing an example of a recognition system according to a second embodiment of the present invention.

Next, a recognition system according to a second embodiment is described. FIG. 10A is a schematic view of a recognition system according to the second embodiment. The recognition system according to the second embodiment notifies whether or not others are gazing at (recognizing) the user itself.

Conventionally, it is difficult for the user itself to know if others are gazing at the user itself. However, when driving a vehicle and the like, whether or not they have been recognized by another party that is passing by or crossing is an important factor for accident prevention for example. Moreover, for example at a party of certain members and the like, there is a case where it becomes important to actively know the mutual level of interest. In this case, if it is possible to know that another person is gazing at them, then it is possible to know that the interest of the other party toward them is high (or to notify that the interest toward the other party is high).

Therefore, the recognition system according to the second embodiment notifies whether or not another person is gazing at (recognizing) the user itself.

Figure 10B:
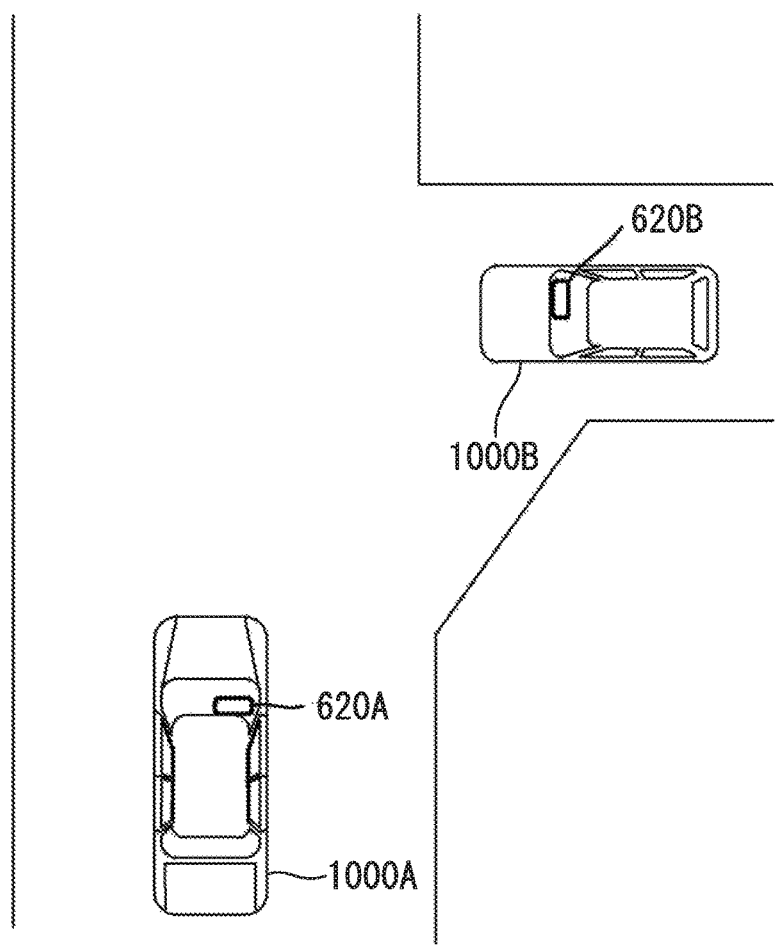
FIG. 10B is a diagram showing an example in which the recognition system shown in FIG. 10A is applied.

In FIG. 10B, an example is presented where, in a case where a user A that is driving an automobile 1000A has approached an intersection, notification is performed with respect to the user A regarding whether or not a user B that is driving another automobile 1000B has recognized the user A.

A terminal 620A utilized by the user A and a terminal 620B utilized by the user B are respectively eyeglass-type terminals such as shown in FIGS. 9A and 9B. The user A is wearing the terminal 620A, and the user B is wearing the terminal 620B. However, the terminals 620A and 620B may be portable-type terminals such as smartphones, terminals mounted on the automobiles 1000A and 1000B (terminals integrated with room mirrors for example), and the like.

Figure 10C:
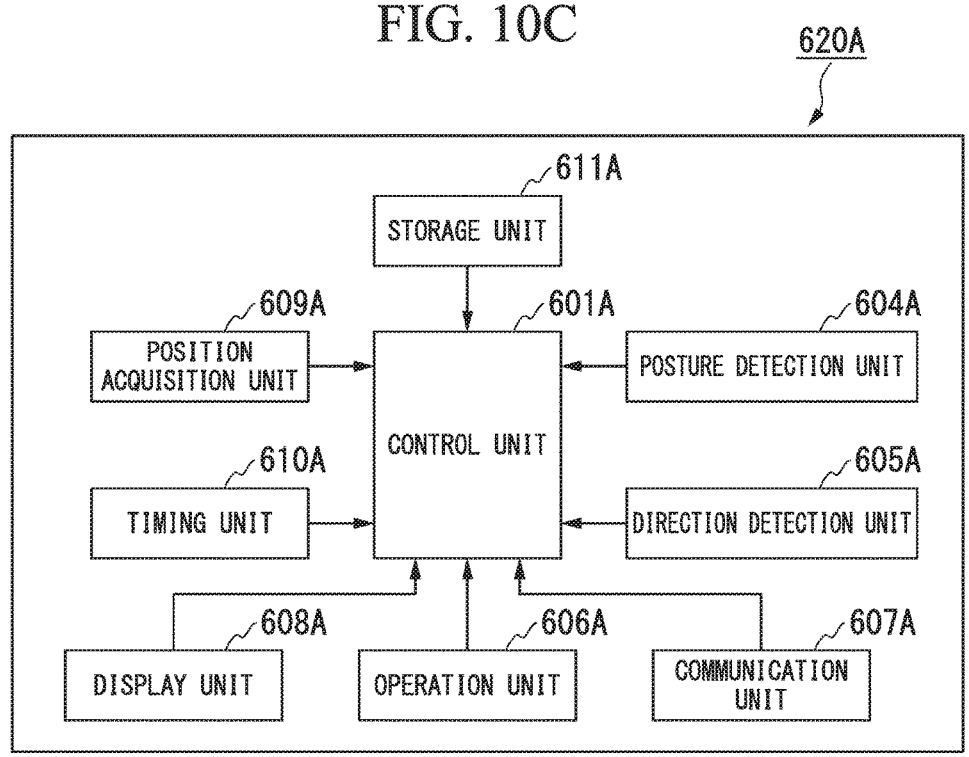
FIG. 10C is a block diagram showing a configuration of a terminal shown in FIG. 10A.

FIG. 10C is a block diagram showing a configuration of the terminal 620A. The terminal 620A includes a control unit 601A, a posture detection unit 604A, a direction detection unit 605A, an operation unit 606A, a communication unit 607A, a display unit 608A, a position acquisition unit 609A, a timing unit 610A, and a storage unit 611A.

Figure 10D:
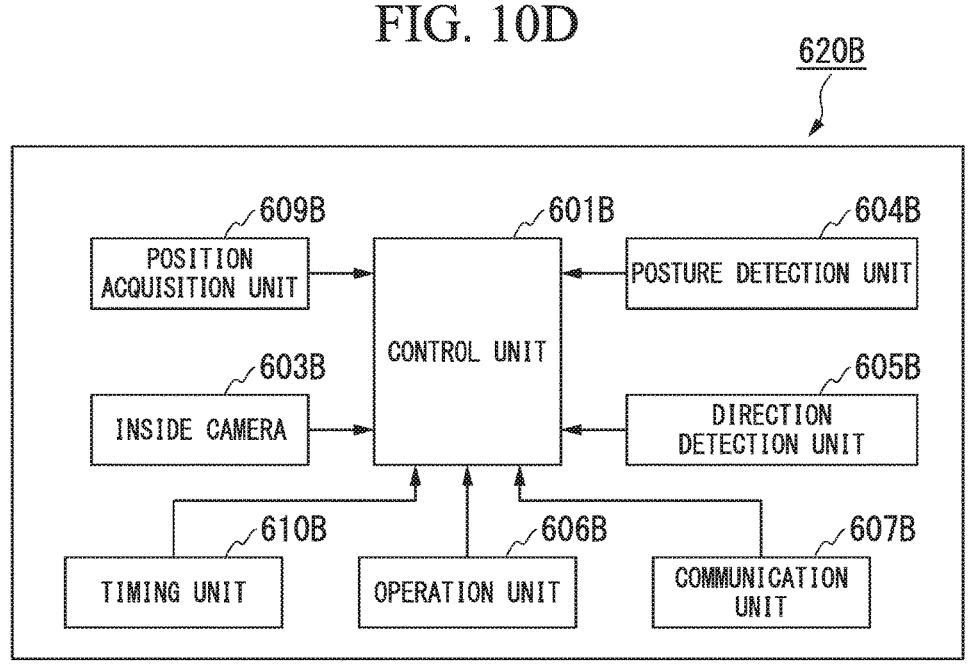
FIG. 10D is a block diagram showing a configuration of the terminal shown in FIG. 10A.

FIG. 10D is a block diagram showing a configuration of the terminal 620B. The terminal 620B includes a control unit 601B, an inside camera 603B, a posture detection unit 604B, a direction detection unit 605B, an operation unit 606B, a communication unit 607B, a position acquisition unit 609B, and a timing unit 610B.

The posture detection unit 604A (604B) may be a gyro sensor. The posture detection unit 604A (604B) detects the direction of the terminal 620A (620B). If the terminal 620A (620B) is an eyeglass-type terminal, the posture detection unit 604A (604B) may detect the posture of the lens section of the eyeglasses. The direction detection unit 605A (605B) may be a geomagnetic sensor. The direction detection unit 605A (605B) detects the direction that the terminal 620A (620B) is facing. If the terminal 620A (620B) is an eyeglass-type terminal, the direction detection unit 605A (605B) may detect the direction that the lens section of the eyeglasses is facing. The position acquisition unit 609A (609B) may be a GPS (global positioning system). The timing unit 610A (610B) measures the current time.

Figure 10E:
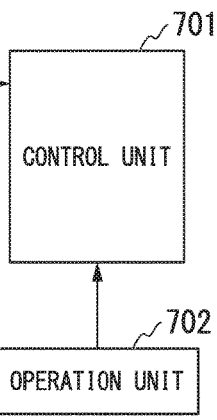
FIG. 10E is a block diagram showing a configuration of a server shown in FIG. 10A.

FIG. 10E is a block diagram showing a configuration of the server 700. The server 700 includes a control unit 701, a communication unit 702, and a storage unit 703.

Figure 11:
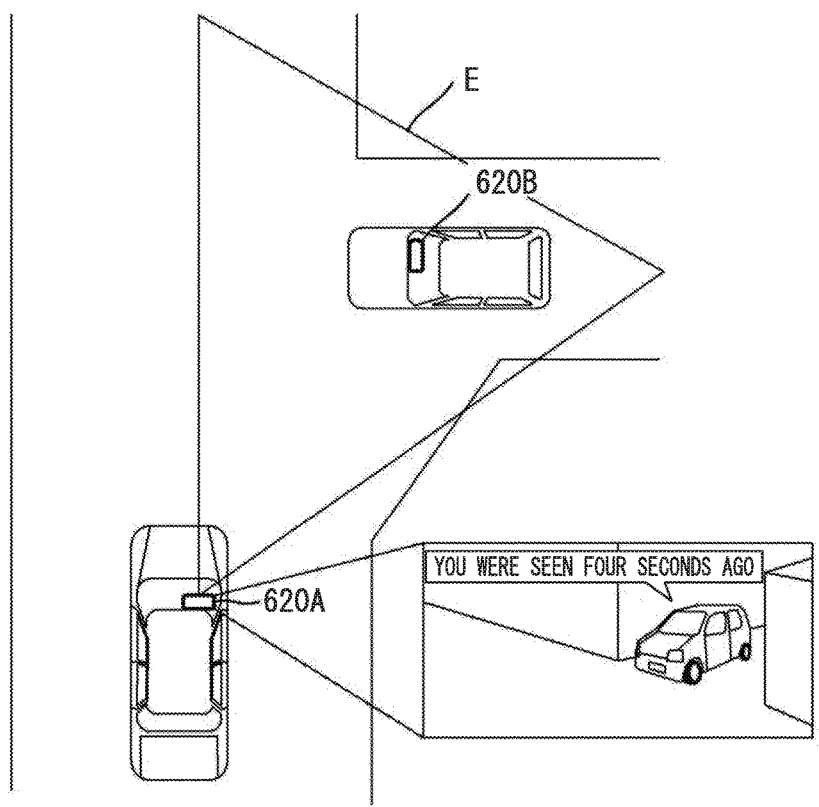
FIG. 11 is a drawing showing an example of a notification in the second embodiment of the present invention.

As shown in FIG. 11, if the user B of the terminal 620B enters the field of view E of the user A, then the terminal 620A displays on the display unit 608A a notice indicating that the user B is gazing at the user A (such as "you were seen four seconds ago") for example. If the terminal 620A is an eyeglass-type terminal, it may utilize the position information of the terminal 620B and display the notice thereof on a section of the lens section of the eyeglasses, which constitutes the display unit 608A, corresponding to the position of the terminal B.

Hereunder, an operation of the terminals 620A and 620B and the server 700 for performing such a notification is described.

Figure 12A:
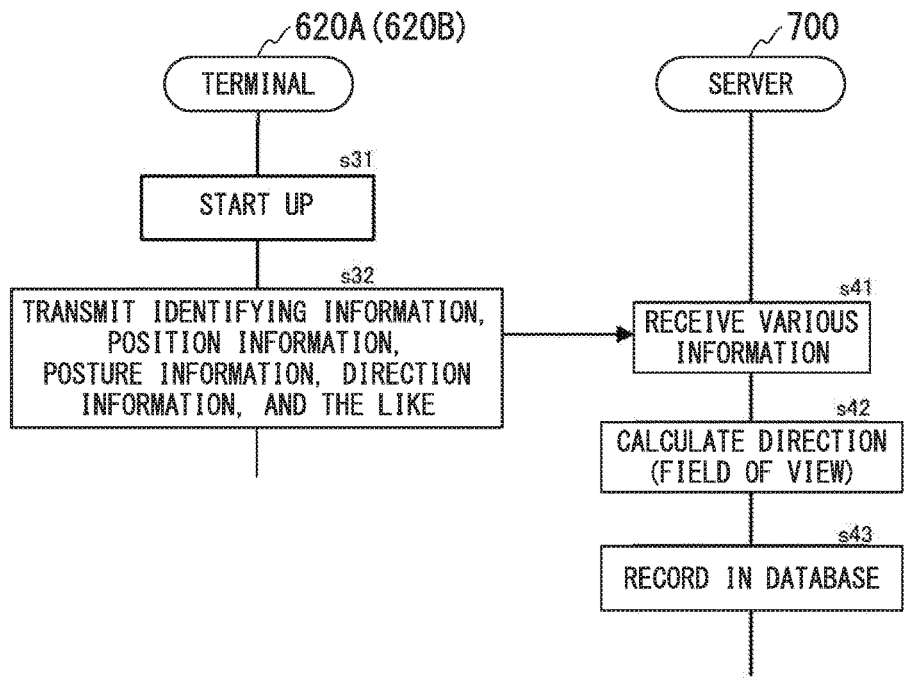
FIG. 12A is a flowchart showing an operation of the terminal and the server in the second embodiment of the present invention.

FIG. 12A is a flowchart showing the operation of the terminal 620A (620B) and the server 700. The operation of the terminal 620A (620B) and the server is described with reference to FIG. 12A.

An application program for performing a notification according to the second embodiment starts up as a result of the user A (user B) operating the terminal 620A (620B) via the operation unit 606A (606B). Then, as shown in FIG. 12A, the control unit 601A (601B) of the terminal 620A (620B) firstly starts up the posture detection unit 604A (604B), the direction detection unit 605A (605B), and the position acquisition unit 609A (609B), which are built into the terminal 620A (620B) (step s31). The control unit 601A (601B) makes the posture detection unit 604A (604B) acquire posture information that represents the posture of the terminal 620A (620B). The control unit 601A (601B) makes the direction detection unit 605A (605B) acquire direction information that represents the direction of the terminal 620A (620B). The control unit 601A (601B) makes the position acquisition unit 609A (609B) acquire position information representing the position (a latitude and a longitude for example) of the terminal 620A (620B). The communication unit (transmission unit) 607A (607B) transmits identifying information (a MAC address for example), the position information, the posture information, and the direction information of the terminal 620A (620B) to the externally provided server 700 (step s32). The communication unit 702 of the server 700 receives the various information from the terminal 620A (620B) (step s41). The control unit 701 of the server 700 calculates a line-of-sight direction (that is to say, a field of view) of the user A (user B) based on the posture information and the direction information detected by the terminal 620A (620B) (step s42). If the terminal 620A (620B) is an eyeglass-type terminal, the field of view may represent, with the position of the terminal 620A (620B) as a reference, a range of 45 degrees left and right and a radius of 10 m in the horizontal direction with respect to the front direction of the lens section of the eyeglasses of the terminal 620A (620B) for example. The position of the terminal 620A (620B) is determined from the position information of the terminal 620A (620B). The front direction of the lens section of the eyeglasses of the terminal 620A (620B) is determined from the posture information and the direction information of the terminal 620A (620B). Further, the control unit 701 associates the identifying information, the position (position information), and the information relating to field of view of the terminal 620A (620B), and records them in a database that is stored in the storage unit 703 (step s43).

The server 700 may distribute the various information recorded in the database of the storage unit 703 to the terminals 620A and 620B.

As a result of distributing the position information of the terminal 620B to the terminal 620A, it is possible to display the position of the terminal 620B on a map image on the terminal 620A for example.

Figure 12B:
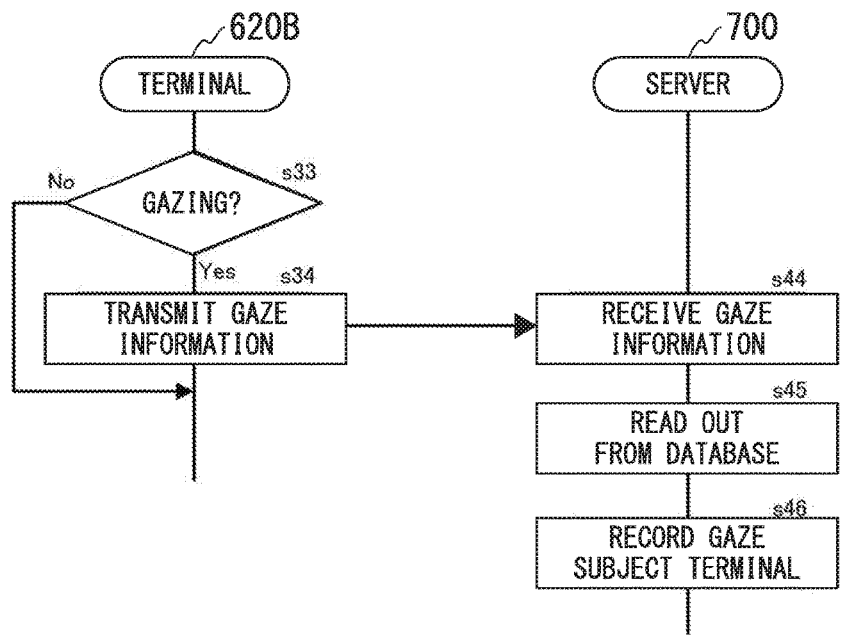
FIG. 12B is a flowchart showing an operation of the terminal and the server in the second embodiment of the present invention.

FIG. 12B is a flowchart showing an operation of the terminal 620B and the server 700. The operation between the terminal 620B and the server 700 is described with reference to FIG. 12B. The same operation as the operation of terminal 620B shown in FIG. 12B may be performed by the terminal 620A.

The control unit 601B of the terminal 620B, as shown in FIG. 12B, periodically (every 1 sec for example) determines whether or not the user B is gazing at another user (step s33). As a specific example, a case in which the user B's gaze is detected by using image data acquired as a result of the inside camera (image capturing unit) 603B capturing an image of user B's face is described. In this case, the control unit 601B determines that the user B is gazing at another user if the user B's gaze is facing in a specific direction for more than a predetermined time (1 sec or more for example). If the control unit 601B determines that the user B's gaze is facing in a specific direction, it makes the communication unit 607B transmits to the server 700 information (including identifying information (such as the MAC address) of the terminal 620B) indicating that the user B is gazing at another user (step s34). The technique that detects the user B's line-of-sight may be the same technique as described in the first embodiment. The control unit 601B may also transmit time information together with the information. The time information may represent information that indicates a time measured by the timing unit 610B at which the user B's line-of-sight started to face in the specific direction.

If the communication unit 702 receives from the terminal 620B information indicating that the user B is gazing at another user (step s44), the control unit 701 reads out, based on the identifying information of the terminal 620B included in the information thereof, the field of view and the position information of the terminal 620B recorded in the database of the storage unit 703 (step s45). The control unit 701, based on the field of view of the terminal 620B and the positions of the other terminals, selects the terminal that the user B is gazing at among the other terminals present within the field of view of the terminal 620B. The control unit 701 records the selected terminal thereof as a gaze subject terminal in the database of the storage unit 703 (step s46). If a plurality of other terminals is present within the field of view of the terminal 620B, the control unit 701 may select the terminal that is closest to the terminal 620B for example. This is because, normally, a user gazes at the person closest to them, and a person distant from them is often hidden behind a person that is near them. At the time the gaze subject terminal is selected, the height direction position of the terminal within the field of view may be considered. In this case, even if the terminal is present within the field of view in a plan view, the terminal thereof may be excluded from selection if it is outside the field of view in the height direction.

As a specific example, a method of determining that the terminal at which the user B is gazing is the terminal 620A is described. Here, it is assumed that a plurality of terminals including the terminal 620A are present within the field of view of the terminal 620B, and the terminal 620A is the nearest to the terminal 620B. The control unit 701, based on the field of view and the position information of the terminal 620B and the position information of the plurality of other terminals, determines the nearest position information that is contained in the field of view of the terminal 620B and nearest to the position information of the terminal 620B (proximity position information) among the position information of the plurality of other terminals. The control unit 701, by referring to the identifying information and the position information of the terminal 620A, which are recorded in the database of the storage unit 703 and are mutually associated, determines that the identifying information associated with the proximity position information represents the identifying information of the terminal 620A. Consequently, the terminal at which the user B is gazing is determined as the terminal 620A. In this case, the control unit 701 associates the identifying information of the terminal 620A that has been determined, with time information received from the terminal 620B, and records them as gaze information in the database of the storage unit 703.

As a result of the processing above, it is possible to accumulate in the database of the storage unit 703 information representing the terminal at which the user B of the terminal 620B is gazing. FIG. 13A and FIG. 13B represent gaze information recorded in the database stored in the storage unit 703. FIG. 13A represents gaze information relating to the user A (terminal 620A). FIG. 13B represents gaze information relating to the user B (terminal 620B).

The gaze information includes for each user (each terminal) the identifying information (MAC address) of the terminal (gaze subject terminal) possessed by the other user that has been gazed at by the user thereof, and time information representing the time (date and time) at which the user thereof performed the gaze. As shown in FIG. 13A, the gaze information of the user A (terminal 20A) includes the MAC address of the terminal 620A, the MAC addresses of the terminals possessed by the other users at which the user A has gazed, and time information, which are mutually associated.

Figure 14:
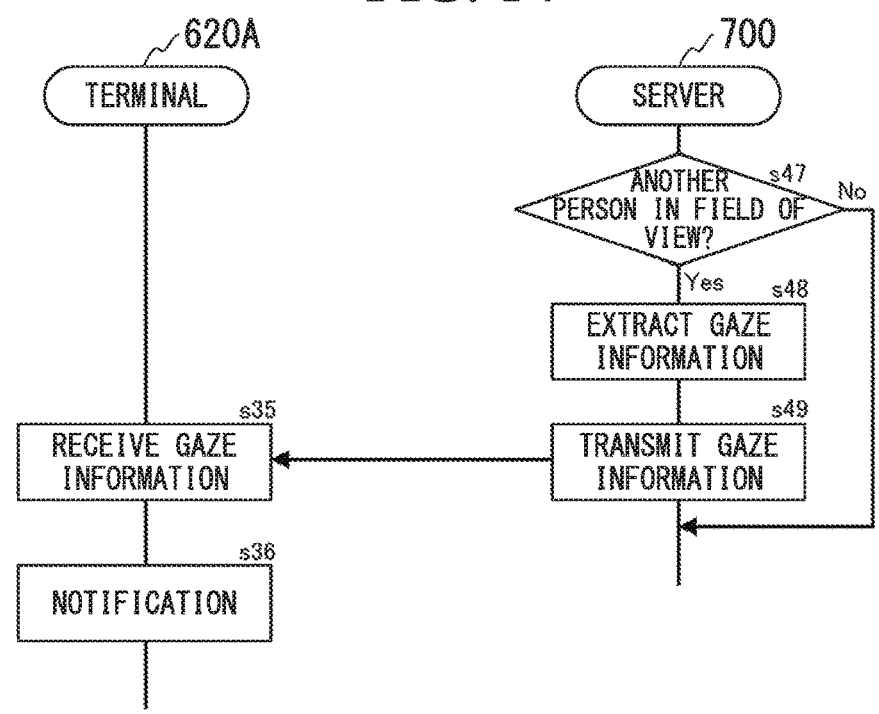
FIG. 14 is a flowchart showing an operation of the terminal and the server according to the second embodiment of the present invention.

FIG. 14 is a flowchart showing an operation of the terminal 620A and the server 700. The same operation as the operation of the terminal 620A shown in FIG. 14 may be performed by the terminal 620B.

As shown in FIG. 14, the control unit 701 of the server 700 periodically (every 1 sec for example) refers to the database and determines whether or not another terminal has entered into the field of view of each terminal (step s47). As a specific example, a case where the control unit 701 determines, based on the field of view and the position information of the terminal 620A and the position information of the terminal 620B, that the terminal 620B has entered into the field of view of the terminal 620A is described. In this case, the control unit 701 refers to the gaze information (the database shown in FIG. 13B) of the terminal 620B in the database, and extracts the MAC address of the terminal 620A (step s48). The control unit 701 extracts only the gaze information associated with a time included in a predetermined extraction period. The predetermined extraction period represents a period from a time returning in time from the current time by a predetermined time (5 sec for example) to the current time. That is to say, the control unit 701 ignores gaze information associated with a time further in the past than the predetermined extraction period. The reason thereof is described. When driving an automobile and the like, each user continues to move. Consequently, whether or not another person has recognized them in the present is important. On the other hand, whether or not another person has recognized them in the past is not important. If information exists that shows that the user B (terminal 620B) was gazing at the user A (terminal 620A), then the control unit 701 makes the communication unit 702 transmit (together with the position information of the terminal 620A) the information thereof (gaze information) to the terminal 620A (step s49).

The control unit 601A of the terminal 620A receives from the server 700 via the communication unit (receiving unit) 607A (together with the position information of the terminal 620A) information (gaze information) representing that the user B is gazing at the user A (step s35). The control unit 601A, based on the information thereof, notifies the user A that the user B is gazing at the user A (step s36). For example, the control unit 601A, as shown in FIG. 11, makes the display unit 608A display in the direction of the terminal 620B (the section corresponding to the position of the terminal 620B) that the user B is gazing at the user A (such as "you were seen four seconds ago"). Alternatively, the control unit 601A may perform the notification by means of a sound.

A specific example for the terminal 620A to perform notification that the user B is gazing at the user A is described. Here, it is assumed that the information indicating that the user B (terminal 620B) was gazing at the user A (terminal 620A) includes the MAC address of the terminal 620B and time information representing the time at which the gaze was performed by the user B of the terminal 620B. The storage unit 611A records correspondence information in which the MAC address of the terminal 620B and the user B (or the terminal 620B) are associated. The control unit 601A, by comparing the MAC address included in the gaze information and the correspondence information thereof, determines that the other person (terminal) gazing at the user A is the user B (terminal 620B). Furthermore, the control unit 601A makes the timing unit 610A measure the current time. The control unit 601A determines from the difference between the measured current time and the time indicated by the time information included in the gaze information, a time returning in time by the amount of the time difference (4 sec for example) with the current time as a reference. The control unit 601A utilizes the information to make the display unit 608A display that the user B (terminal 620B) has previously gazed at the user A at the time returning in time by the amount thereof.

Consequently, the user A, which represents the driver of the automobile 1000A is able to know whether or not the user B, which represents the driver of the automobile 1000B, has recognized the user A. If the server 700 is distributing to each terminal the various information recorded in the database of the storage unit 703, the positions of the other terminals can be displayed on a map image for example. Consequently, if the position of the terminal 620B is displayed on the map image displayed on the display unit 608A, but there is no display in the direction of the terminal 620B that the user B is gazing at the user A, then the user A is able to determine that the user B has not recognized the user A for example.

In the manner above, the recognition system according to the second embodiment is able to notify whether or not another person is gazing toward (has recognized) the user itself.

The foregoing has described in detail the embodiments of the present invention with reference to the drawings, although specific configurations are in no way limited to the embodiments described above. The present invention includes design changes, and the like, without departing from the scope of the present invention.

A program for realizing the functions of the devices (the terminal 20 for example) according to the embodiments described above may be recorded on a computer-readable recording medium, and the processing may be performed by making a computer system read the program recorded on the recording medium, and then executing it.

The "computer system" referred to here may include an operating system (OS: Operating System) and hardware such as peripheral devices.

The "computer-readable recording medium" includes writeable non-volatile memory such as a flexible disk, a magnetic optical disk, a ROM (Read Only Memory), or flash memory, a portable medium such as a DVD (Digital Versatile Disk), and a storage apparatus such as a hard disk that is built into the computer system.

The "computer-readable recording medium" includes those that retain the program for a fixed time, such as a volatile memory (DRAM (Dynamic Random Access Memory) for example) within the computer systems that become the server and client in a case where the program is transmitted via a network, such as the Internet, or a communication line, such as a telephone line.

The program described above may be transmitted from a computer system storing the program in a storage apparatus, and the like, to another computer system via a transmission medium or a transmission wave within the transmission medium. The "transmission medium" that transmits the program refers to a medium having a functionality that transmits information, including a network (communication network) such as the Internet, and a communication circuit (communication line), such as a telephone line.

The program described above may be one that realizes a portion of the functionality mentioned above.

The program described above may be one that realizes the functionality mentioned above by being combined with a program that has previously been stored in the computer system, as a so-called difference file (difference program).

INDUSTRIAL APPLICABILITY

The present invention may be applied to a position determination apparatus, an audio apparatus, a position determination method, and a program.

REFERENCE SYMBOLS

1 Input unit
2 Signal processing unit
3 Output unit
4 Communication unit
5 Control unit
10 Audio apparatus
20 Terminal
100 Server
101 Control unit
102 Outside camera
103 Inside camera
104 Posture detection unit
105 Direction detection unit
106 Operation unit
107 Communication unit
108 Display unit

The invention claimed is:

1. A position determination apparatus comprising:
a first processor configured to implement instructions stored in a first memory;
wherein the first processor is configured to execute:
an image capturing task that captures an image of a loudspeaker from a listening position while facing in an image capturing direction, to acquire image data;
a direction detection task that detects the image capturing direction;
a recognition task that recognizes an image of the loudspeaker from the image data;
a distance calculation task that calculates a distance from the listening position to the loudspeaker by using the image of the loudspeaker; and
a location determination task that determines a location of the loudspeaker based on the image capturing direction detected by the direction detection task and the distance calculated by the distance calculation task.

2. The position determination apparatus according to claim 1, wherein:
the distance calculation task calculates the distance based on a size of the image of the loudspeaker.

3. The position determination apparatus according to claim 1, wherein the first processor is further configured to execute a model determination task that determines a model of the loudspeaker by using the image of the loudspeaker,
wherein the distance calculation task reads out from a database, scale data of the model determined by the model determination task, and
the distance calculation task calculates the distance based on the scale data and the image of the loudspeaker.

4. The position determination apparatus according to claim 3, wherein the scale data is a coefficient representing a ratio of a width of an image of a reference loudspeaker with respect to a width of a frame of a reference image, the reference loudspeaker being contained in the reference image, the reference image being constituted by reference image data acquired by capturing an image from a position away from a reference loudspeaker by a reference distance.

5. An audio apparatus comprising:
a second processor configured to implement instructions stored in a second memory; and
a communication interface;
wherein the second processor is configured to execute:
a communication task that communicates with the position determination apparatus according to claim 1 using the communication interface;
a correction task that receives information relating to the location of the loudspeaker determined by the location determination task, the correction task that corrects a volume and a delay amount of an audio signal to be supplied to the loudspeaker, based on the information relating to the location of the loudspeaker.

6. The audio apparatus according to claim 5, wherein the correction task corrects a volume difference resulting from an efficiency difference between the loudspeaker and another loudspeaker, based on a model of the loudspeaker.

7. A position determination method comprising:
capturing an image of a loudspeaker from a listening position while facing in an image capturing direction, to acquire image data;
detecting the image capturing direction;
recognizing an image of the loudspeaker from the image data;
calculating a distance from the listening position to the loudspeaker by using the image of the loudspeaker; and
determining a location of the loudspeaker based on the detected image capturing direction and the calculated distance.

8. A non-transitory computer-readable recording medium that stores a program that causes a computer to execute:
capturing an image of a loudspeaker from a listening position while facing in an image capturing direction, to acquire image data;
detecting the image capturing direction;
recognizing an image of the loudspeaker from the image data;
calculating a distance from the listening position to the loudspeaker by using the image of the loudspeaker; and
determining a location of the loudspeaker based on the detected image capturing direction and the calculated distance.

* * * * *